United States Patent [19]

West

[11] Patent Number: 4,797,602

[45] Date of Patent: Jan. 10, 1989

[54] DYNAMO ELECTRIC MACHINES

[75] Inventor: John G. W. West, Pershore, England

[73] Assignee: Lucas Industries Public Limited Company, Birmingham, England

[21] Appl. No.: 13,706

[22] Filed: Feb. 12, 1987

[30] Foreign Application Priority Data

Feb. 13, 1986 [GB] United Kingdom ............... 8603590

[51] Int. Cl.$^4$ ................. F02N 11/04; H02K 1/00; H02K 21/12
[52] U.S. Cl. ........................ 322/10; 290/46; 310/156; 310/216; 322/90
[58] Field of Search ............... 322/10, 11, 90; 310/156, 216; 290/38, 46

[56] References Cited

U.S. PATENT DOCUMENTS

| | | | |
|---|---|---|---|
| 4,330,743 | 5/1982 | Glennon | 322/10 |
| 4,395,815 | 8/1983 | Stanley et al. | 310/216 X |
| 4,427,462 | 1/1984 | Senno et al. | 310/216 X |
| 4,459,536 | 7/1984 | Wirtz | 322/10 |
| 4,638,200 | 1/1987 | Lecorre et al. | 310/156 |
| 4,667,123 | 5/1987 | Denk et al. | 310/156 |
| 4,694,654 | 9/1987 | Kawamura | 310/156 X |

Primary Examiner—R. J. Hickey
Attorney, Agent, or Firm—Holman & Stern

[57] ABSTRACT

A unitary starter motor and generator including a rotor assembly having as plurality of circumferentially disposed rare earth-iron permanent magnets, a stator assembly within which said rotor assembly is rotatable, said stator assembly including a laminated annular stator body formed from a silicon containing iron alloy of high electrical resistivity and low magnetic loss, and a multiphase stator winding secured to the inner periphery of said stator body and lying in the airgap defined between the stator body and the rotor assembly. A semiconductor inverter-rectifier assembly electrically connected with said multiphase stator winding for rectifying and controlling the output from the stator winding when acting in generator mode, and for switching the input to the winding when operating in motor mode, and, a sensing means associated with said semiconductor inverter-rectifier assembly whereby the angular position of the rotor assembly is determined for controlling switching of the electrical input to the stator winding to afford operation in motor mode.

7 Claims, 3 Drawing Sheets

FIG. I.

DYNAMO ELECTRIC MACHINES

This invention relates to a unitary starter motor and generator for use in an internal combustion engine starting and electrical system, particularly but not exclusively for an automobile.

For convenience throughout the following description and claims a unitary starter-motor and generator will be referred to as a starter-generator.

Starter-generators of low power rating suitable for use with, for example, motor cycle engines have been known for many years. However, such devices are not suitable for use with automobile engines owing to their low power rating and to the disparity between the electrical power output needed to supply the requirements of the automobile electrical system and the mechanical power output which is needed when operating the device in motor mode to afford efficient engine cranking during starting. Attempts have been made to overcome the disparity problem by using complex drive ratio changing mechanisms and/or by the use of alternative windings within the device used respectively in the generator and motor modes. However, such attempts have proved unsatisfactory.

The trend in automobiles, particularly cars, is towards greater electrical consumption, and this dictates greater generator output. This trend has lead us to consider higher automobile battery/starter/generator voltages than the present 12 volt standard, and 24 to 48 volt systems are now under consideration. Although it is convenient to consider 48 volt systems since this is a single multiple of the usual 12 volt system it is perhaps more likely that 42 volts would be the maximum nominal voltage in view of many countries adopting 50 volts as the maximum voltage for safe operation. A 42 volt system using for example a 21 cell lead acid battery would operate, during battery charging, at 48 volts with possible peaks during charging at the 50 volt permitted maximum. We have recognised that the reduction in current which such changes in operating voltage entail can facilitate the design of a starter-generator for automobiles, and it is object of the present invention to provide a starter-generator for use in automobiles.

A starter-motor-generator according to the present invention comprises:

a rotor assembly including a plurality of circumferentially disposed rare earth-iron permanent magnets, a stator assembly within which said rotor assembly is rotatable, said stator assembly including an annular stator body formed from a silicon containing iron alloy of high electrical resistivity and low magnetic loss, and a multiphase stator winding secured to the inner periphery of said stator body and lying in the airgap defined between the stator body and the rotor assembly, a semiconductor inverter-rectifier assembly electrically connected with said multiphase stator winding for rectifying and controlling the output from the stator winding when acting in generator mode, and for switching the input to the winding when operating in motor mode, and, means associated with said semiconductor inverter-rectifier assembly whereby the angular position of the rotor assembly is determined for controlling switching of the electrical input to the stator winding to afford operation in motor mode.

Preferably said silicon containing iron alloy has an amorphous or microcrystalline structure.

Conveniently the starter-motor-generator is designed to operate in a vehicle electrical system whose nominal operating voltage is selected from the range 24 to 42 volts.

Desirably the stator body is a spiral wound alloy strip.

Preferably said permanent magnets are encircled by a stainless steel band.

Alternatively said permanent magnets are encircled by a band of synthetic resin material.

Preferably the rare earth component of the material of said permanent magnets is chosen from the group comprising, neodymium, praesodymium, a mixture of neodymium and praesdymium, and, misch-metal.

One example of the present invention is illustrated in the accompanying drawings wherein.

Figure 1:
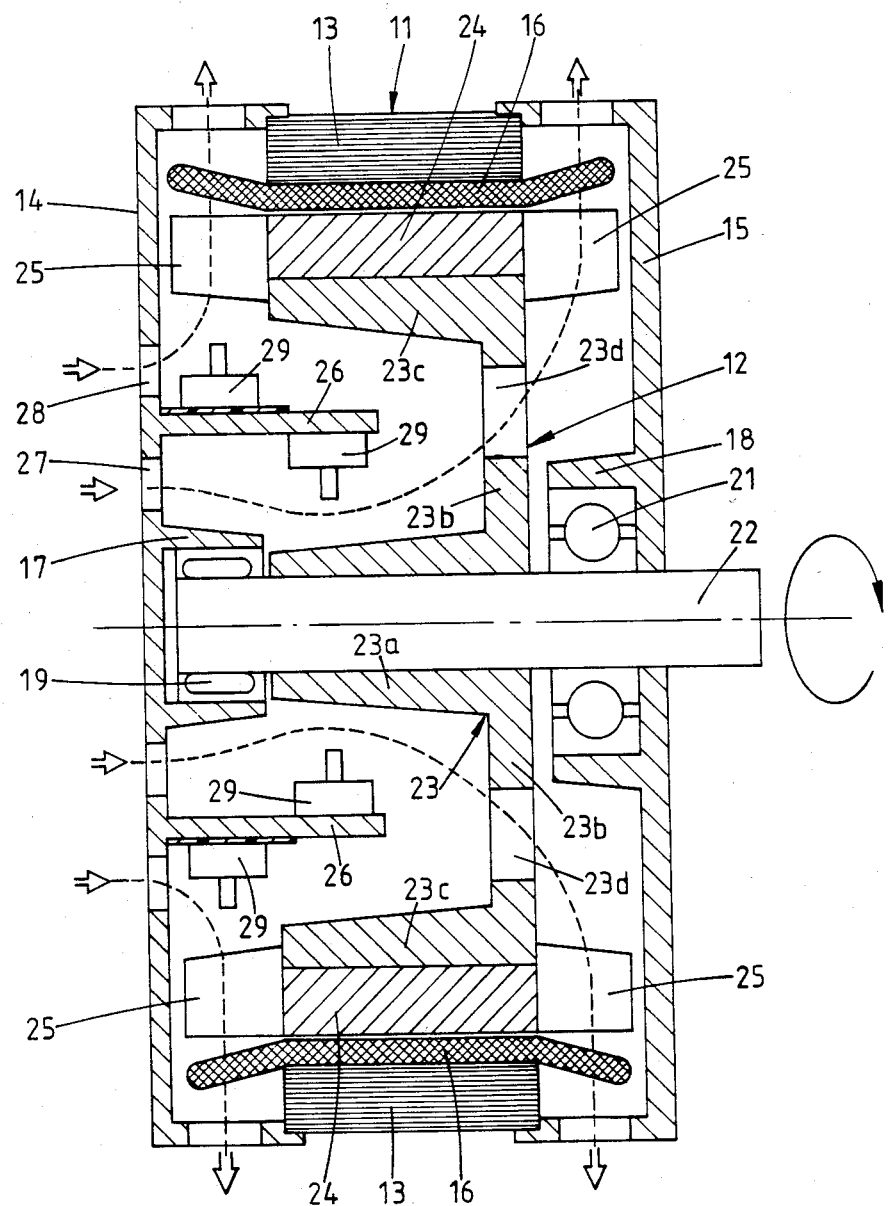
FIG. 1 is a diagrammatic sectional view of a starter-generator.

Referring to the drawings, the starter-generator includes a stator assembly 11 and a rotor assembly 12, the rotor assembly 12 being rotatable within the stator assembly 11. The stator assembly 11 includes an annular laminated stator body 13 of cylindrical form, opposite axial ends of which are engaged by respective die-cast end caps 14, 15. The stator body 13 is formed from an elongate thin strip of an amorphous iron alloy containing silicon. Suitable materials are those known under the Trade Name METGLAS, and these alloys have both low hysteresis loss and low eddy current loss. The high electrical resistivity and the thin nature of the strip minimise the flow of eddy currents in the material in use. As an alternative an iron silicon alloy of microcrystalline structure may be used, and in this event the preferred silicon proportion is from 3 to 7 per cent by weight. The thickness of the iron alloy strip is in the range 0.04 to 0.12 mm, and the strip is wound in a spiral so that the stator body has a laminar nature, the laminations being substantially concentric. Although the use of strip wound to form a laminated body is preferred it must be recognised that that it may be possible to obtain similar properties in a stator body formed from the same alloy but by powder metallurgy or similar techniques.

Although the use of amorphous or microcrystalline silicon containing iron alloy is preferred for the manufacture of the stator body 13 it is believed that an acceptable performance in terms of loss can be obtained using traditional silicon-iron steels provided that the material has not been subjected to high mechanical stress. Thus using traditional silicon-iron steel it would not be possible to use the spiral winding technique discussed above. Instead flat 120° segments would be stamped from steel sheet, sets of three segments would be arranged to form annulii and the annulii would then be stacked in facial contact to form the stator body. Desirably the angular orientation of adjacent annulii would be displaced by 60° to ensure that segment edges do not align in adjacent annulii.

The inner face of the stator body 13 is cylindrical, and bonded to the inner face is a three phase stator winding 16. The conductors of the stator winding are conveniently bonded to form a rigid mass by means of an electrical insulating synthetic resin material having good thermal conductivity, and preferably including glass fibres. The winding is of cylindrical form, and is bonded to the inner surface of the stator body 13 so as to be supported thereby, and to be in good heat exchange relationship therewith. The opposite axial ends of the windings 16 project outwardly beyond the axial ends of the stator body 13, and are received in voids defined within the end caps 14, 15. The inner face of the winding 16 presents a smooth cylindrical surface concentric with the stator body 13.

Intergral with one end cap 14 and extending axially inwardly towards the other end cap 15 is a hollow bush 17. The other end cap 15 is formed with a similar inwardly extending bush 18, the bush 18 being of larger diameter than the bush 17. The bush 17 receives a roller bearing assembly 19 and the bush 18 receives a ball bearing assembly 21, the bearing assemblies 19, 21 rotatably supporting a rotor shaft 22, the shaft 22 having its axis coextensive with the axis of the stator assembly 11. The shaft 22 terminates at one end within the bearing assembly 19, and protrudes at its opposite end through the bearing assembly 21, and through a correspondingly positioned aperture in the end cap 15 so as to be accessible at the exterior of the end cap 15.

Rigidly secured to the shaft 22, between the end caps 14, 15, is a mild steel rotor body 23. The rotor body 23 includes a sleeve portion 23a engaging the shaft 22, a disc portion 23b integral with the sleeve portion 23a and lying at one axial end of sleeve portion 23a, the disc portion 23b extending at right angles to the shaft 22. At its outer edge the disc portion 23 includes a further sleeve portion 23c concentric with the shaft 22. The disc portion 23b is formed with a circular row of apertures 23d to facilitate a cooling air flow through the rotor body in use. The apertures 23d may have their axes inclined with respect to the rotational axis so that the edges of the apertures act as fan blades enhancing the cooling air flow during rotation of the rotor. The outer face of the sleeve portion 23c is cylindrical, and is concentric with the stator body 13. The sleeve portion 23c is of axial length equal to the axial length of the stator body 13, and the stator body 13 and the sleeve portion 23c, are radially aligned. Bonded by means of a convenient epoxy resin material to the outer face of the sleeve portion 23c, is an equal number plurality of equiangularly spaced arcuate permanent magnets 24 conveniently six, eight, ten, or twelve in number the magnets being spaced apart by non-magnetic material conveniently synthetic resin or aluminum.

Figure 3:
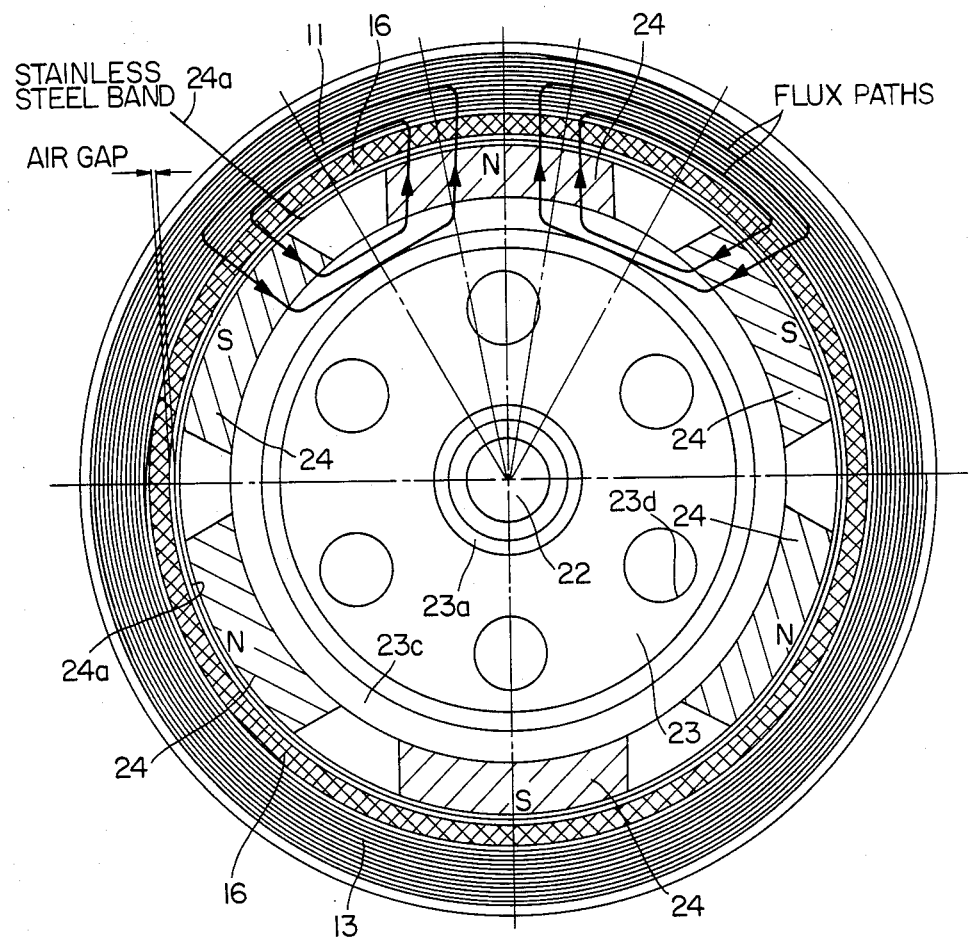
FIG. 3 is a transverse sectional view of the starter-generator.

The outer-most faces of the permanent magnets are part cylindrical, and define circumferentially spaced parts of an imaginary cylindrical surface having its axis coextensive with the axis of the shaft 22. As shown in FIG. 3, a thin cylindrical band 24a of stainless steel may encircle the rotor assembly, engaging the outer faces of the permanent magnets 24. The use of such a stainless steel band 24 a would provide added security by supporting the magnets against the effects of centrifugal force as the rotor assembly rotates. Furthermore, such a stainless steel band 24a would minimise windage losses as the rotor rotates, and would act as a damper minimising the effect of any sharp flux spikes which may be generated in use, and which would otherwise tend to have a demagnetizing effect on the permanent magnets.

If desired a strong synthetic resin band (for example KEVLAR or other strong, and if desired reinforced, synethic resin material) could be used but of course without the benefits of spike damping. Moreover a steel band, or conventional high carbon steel banding wire, could be used although this would introduce increased flux leakage. However, provided that the rotor does not include more than six permanent magnets the increased flux leakage may be an acceptable penalty for using a cheaper material.

The permanent magnets 24 constitute the permanent magnet poles of the rotor assembly, and each is formed from a magnetic material of high coercivity. Currently available materials of sufficrently high coercivity fall within the class of permanent magnet materials known as rare earth-iron materials and a particularly suitable permanent magnet material is a material containing neodymium, iron, and boron, or praesodymium, iron and boron. The materials may have additions of for example, cobalt for example replacing 10–20% of the iron content alone or together with other materials such as aluminium, to improve the temperature characteristics of the material. Moreover, rather than using refined rare earth materials, naturally occurrng mixtures may be utilized, for example Misch-metal. It is probable however that such will be sufficiently processed to remove constituents which are positively detrimental to the desired magnet properties. Specially manufactured mixtures, such as a mixture of neodymium and praesodymium may also be used. The stator winding 16, lying between the stator body and the rotor is thus an airgap wrnding.

At each axial end of the sleeve portion 23c of the rotor body 23 there is provided a fan blade assembly 25, the blades either being anchored to, or being integral with the sleeve 23c. The blades 25 rotate with the rotor assembly and generate a radially outwardly directed flow of air. Encircling the bush 17, and integral with the end cap 14, there is provided a cylindrical wall 26 having its axis coextensive with the axis of rotation of the shaft 22. Since the disc portion 23b of the rotor body 23 is disposed at the axial end of the rotor body adjacent the end cap 15, the rotor body 23 presents an annular recess towards the end cap 14. The cylindrical wall 26 extends axially towards the end cap 15, and terminates within the annular recess defined by the rotor body 23. The end cap 14 is formed with a first circular row of apertures 27 disposed between the bush 17 and the cylindrical wall 26 and a second, concentric row of circular apertures 28 disposed outwardly of the cylindrical wall 26. As the rotor assembly 12 rotates the fan blades 25 draw cooling air flows through the apertures 27, 28. Some of the cooling air thus flows on both faces of the cylindrical wall 26 and the flow divides, part of the air flow passing through the apertures 23d of the rotor body 23. The flow is thus drawn through one end only of the machine and is driven by the fan blades 25 through and/or around the projecing portions of the winding 16 to effect cooling of the windings 16 at both axial ends of the stator and exits from the machine by way of apertures provided in the cylindrical outer walls of the end caps 14, 15.

The starter-generator is a brushless dynamo electric machine, having neither sliprings nor commutator. Thus when the machine is operated in its generator mode, and the shaft 22 is rotated by the internal combustion engine, a three phase alternating current output is generated in the stator winding 16 and this output must be rectified, and its voltage controlled, before being supplied to the associated electric storage battery and/or vehicle electrical system. When the starter-generator is being operated in starter-motor mode then the current supply to the stator windings must be switched in order provide the desired rotating flux field necessary to achieve rotation of the rotor. A combined semiconductor rectifier-inverter assembly is provided in order to obtain rectification and control when operating in generator mode, and to effect switching when operating in starter motor mode. The semiconductor devices 29 of the rectifier-inverter assembly can generate significant amounts of heat, and in order to effect good cooling of the semiconductor devices the semiconductor devices are mounted on the inwardly and outwardly directed faces of the wall 26. Thus the devices are in heat exchange relationship with the end cap 14 by way of the wall 26, and additionally lie in the flows of cooling air drawn into the machine through the apertures 27, 28. The devices 29 on the radially outer face of the wall 26 are those which are electrically insulated from the wall and so have a poorer thermal transfer to the wall. However the apertures 28 are greater in number and/or area than the apertures 27 and the devices 29 on the radially outer face of the wall 26 receive an enhanced cooling air flow by comparison with the other devices 29 to compensate for their poorer thermal conjuction to the wall 26. It will be recognised that the cooling air is at its coolest when it enters the machine and thus when it passes over the devices 29. A further advantage of mounting the semiconductor devices on the wall 26 of the end cap 14 is that the making of electrical connections between the stator winding and the semiconductor devices both during manufacture of the machine, and during servicing is considerably simplified. Moreover, the devices occupy an otherwise empty area within the machine, and thus the machine can be particularly compact in its constructron. Since the air inlet apertures 27, 28 are in the non-drive end end cap 14 they can readily be associated with ducting for conducting cold inlet air from the exterior of the vehicle thereby avoiding the possibility of intake of heated air from the vehicle engine compartment.

The operation of the semiconductor devices is generally conventional particularly when acting in rectifier mode. Moreover the generated output is controlled by the semiconductor devices 29 which are switched to effect "chopping" of the output to give a resultant output of desired voltage. Furthermore when operating in motor mode the semiconductor devices can be switched to limit the current flow in the stator winding. This is of particular importance in a motor stall situation where without the intervention of the semiconductor devices the winding current could rise to an unacceptably high value. Terminals will be provided accessible at the exterior of the end cap 14 whereby external electrical connections are made to the devices. Various suitable semiconductor devices exist, for example SCRs (thyristors) MOSFET devices, GTOs and bipolar transistors.

Figure 2:
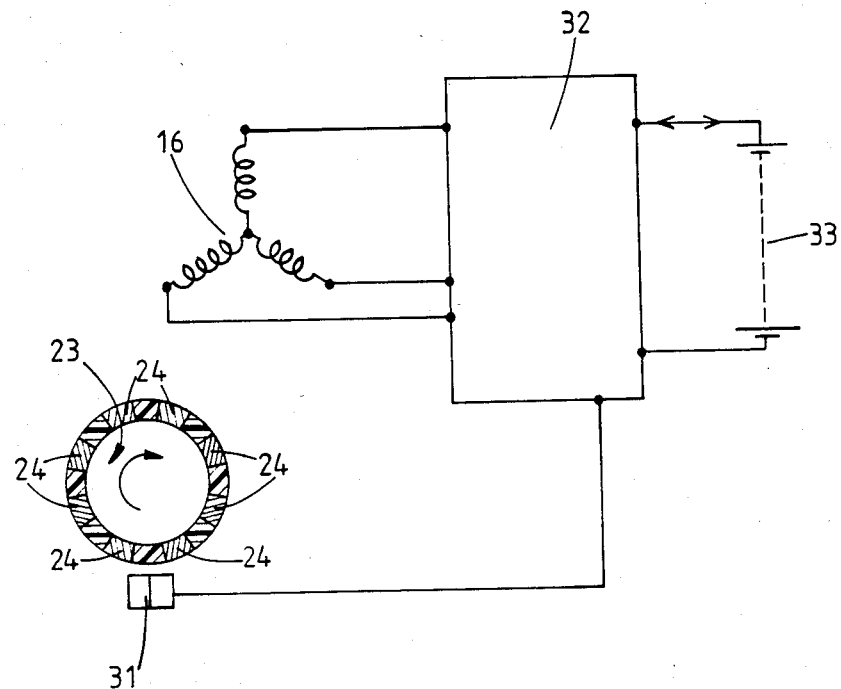
FIG. 2 is a circuit diagram of the starter-generator.

When operating in starter motor mode, in order to effect appropriate switching of the semiconductor devices, it is necessary to establish the angular position of the rotor relative to the stator winding. There are a number of different ways in which this positional relationship can be determined. Conveniently, the machine is equipped with some form of position transducer, for example a spaced pair of Hall-effect devices (shown as transducer 31 in FIG. 2) which monitors the position of the permanent magnets. The transducer will of course be mounted on a stationary part of the machine. The position transducer 31 will provide an input signal to for example a microprocessor control unit which actually effects the switching of the semiconductor devices 29. FIG. 2 shows the microprocessor control unit and the rectifier-inverter assembly as a single block 32 for convenience. A 48 volt battery 33 is also shown in FIG. 2. Six power semiconductor devices 29 will be utilized in a three phase machine and it will be recognised that the current rating of the devices 29 will be determined by the operating voltage of the machine.

Although FIG. 2 illustrates the transducer 31 monitoring the position of the magnets 24 directly it is to be understood that a Hall-effect transducer could conveniently monitor the angular position of the rotor assembly 12 by monitoring the fan blades of one of the fan assemblies 25, provided of course that the blades are ferromagnetic. However it may be preferred by virtue of its lower cost, as an alternative to utilizing a transducer 31, to determine the position of the rotor in relation to the phases of the stator winding 16, by means of an electrical circuit monitoring back e.m.f. in the phases of the stator winding. Such a system will of course require rotation of the rotor in order to generate the back e.m.f., and thus the microprocessor control unit could be so designed that when initiating operation in starter motor mode the microprocessor, without reference to the position of the rotor, will cause switching of the semiconductor devices 29 to apply power to the individual phases of the winding 16 to produce a magnetic field rotating slowly in the desired direction. Such a procedure will cause initial slow rotation of the rotor assembly, and of course immediately the rotor assembly starts to rotate it will be possible for the monitoring system to detect the back e.m.f., generated within the stator windings and to use this information to "update" the microprocessor control unit with appropriate information upon the basis of which the microprocessor unit will effect appropriate switching to cause the machine to operate in starter motor mode. A still further possiblity is to achieve determination of the rotor position by measuring the inductance of the individual phases of the stator winding in order to provide the input signal for the microprocessor.

Although the use of a microprocessor is discussed above, it is to be understood that the use of a microprocessor is not essential. The technology needed to effect switching of the stator winding phases is known in the brushless d.c. motor art, see for example U.S. Pat. No. 4,228,384; "Brushless d.c. traction drive" by Chalmers Pacey and Gibson in the Proceedings of the IEE Vol. 122 No. 7 July 1975; "Electrically Commutated d.c. motors for Electric Vehicles" by Maslowski in SAE Technical Paper Series 810411; and IEE Conference Publication No. 254 page 204 et seq.

It will be recognised that the stator body 13 is of slotless configuration, the stator winding being accommodated in the air gap between the stator body and the rotor assembly. Since the stator body 13 has no slots, there are no stator teeth, and the problem of "tooth ripple" found in conventionally slotted stator machines is not present. This further minimises "pole face losses" in the rotor assembly.

The power output required of a starter motor for a car or other like vehicle is 0.8 to 1.7 KW, and allowing for an efficiency of 67 per cent in the machine of FIG. 1 the power supplied to the motor must be in the range of 1.2 to 2.5 KW. This requirement is not expected to change in vehicles projected for the forseeable future. However, it is expected that the power demanded from the alternator of the vehicle will increase to a point where it lies in the range 1.75 to 2.5 KW. It will be recognised therefore that given these power requirements the power output required of the generator will become compatible with the required power input to the starter motor. Although we have referred to 48 volts as the operating voltage since this appears to be the highest intrinsically safe voltage, it is to be understood that 24 volt systems, or even other voltages between the current 12 volt standard and a 48 volt maximum, preferably between 24 and 42 volts, might be utilized. Moreover since many countries are adopting 50 volts as the maximum permitted voltage, it is probable that a 42 volt standard will be the most attractive. A 42 volt system utilizing a 21 cell lead acid battery or its equivalent would require a charging voltage of around 48 volts which might in use peak at the permitted maximum of 50 volts. It is difficult to envisage a 48 volt system which would be suitable in practical terms while staying within the specified 50 volt maximum. The use of a 42 volt nominal system has the added advantage of maximising the reduction in current for a given power requirement. In order to achieve the desired power ratings the machine of the kind shown in FIG. 1 would need to have a drive ratio, that is to say a ratio of rotor assembly speed to engine crankshaft speed, in the region of 4:1 for optimum effect. For this reason it may be preferred to provide a geared connected between the shaft 22 and the engine crankshaft rather than relying upon belt drives as is the case with present alternators. However, the drive ratio will be the same irrespective of whether the machine is operating in starter motor mode, or generator mode. Thus no complex ratio changing mechanisms will be required. The increase in rotor speed by comparison with conventional alternators may give rise to a rotor speed approaching 30,000 revolutions per minute and thus the use of a stainless steel sleeve embracing the outer faces of the magnets 24 will be extremely desirable. Such high rotor speeds are of course desirable since in general terms increasing the rotor speed increases the power output or alternatively permits the use of a smaller machine for the same output. However with an increase in rotor speed during generation there is an increase in frequency of the generated voltage and increased losses are attendant upon increased frequency. The above described starter-generator counters such increased losses inter alia by the use of an airgap winding and low loss materials in the construction of the stator.

Although the starter motor/generator,/battery charging system of the vehicle may have an operating voltage in excess of the standard 12 volt system it may be desired to maintain the remainder of the electrical system of the vehicle on the 12 volt standard to minimise problems arising for example with filament lamps on the vehicle. It is a known problem of filament lamps that the fragility of the filament increases with increasing operating voltage. There are however many other possiblities, and it may be preferred to design completely new vehicle electrical systems including lighting, window heating and the like to operate on the chosen increased voltage standard.

The trend in internal combustion engines of cars and similar like road vehicles is to reduce idling speeds, and to use higher gear ratios thereby reducing the average engine speed. This effect is to a large extent balanced by increasing the drive ratio between the engine crankshaft and the shaft 22 in the machine shown in FIG. 1.

A start-generator of the kind described above may be particularly suitable for use in a vehicle equipped for stop-start operation. Stop-start operation is a fuel saving device wherein operation of the internal combustion engine is stopped when the vehicle is stationary for more than a few seconds, for example at traffic lights. The internal combustion engine is restarted automatically as the driver makes the normal accelerator and clutch operations associated with causing the vehicle to move away from rest. Clearly, the delay associated with the conventional starter motor pinion engaging mechanism is not present in the permanently engaged starter-generator and the possiblity of the significantly increased cranking speed which the starter-generator offers is attractive when consideration is given to the problems of starting hot internal combustion engines. Thus it may be considered that the unitary starter/generator gives a rapid, reliable, efficient, and quiet method of restarting an engine in a vehicle equipped for stop-start operation. Moreover, irrespective of stop-start opertion the starter-generator can, more effectively than the conventional starter motor, be used to move the vehicle in an emergency, in the event for example of failure of the internal combustion engine.

A significant advantage of increasing the operating voltage of the electrical system of the vehicle resides in the attendent decrease in power losses in the semi-conductor devices of the vehicle. It will be recognised that generally semi-conductor devices have a forward voltage drop of 1 to 1.5 volts per device and in a 12 volt system, where two such devices are in series, (as is normal practice for full wave rectification) a 2 to 3 volt drop will occur. Given a nominal voltage of 12 volts then the voltage drop which occurs is 17 to 25 per centof the nominal voltage. For a 24 volt system the drop is only 8.5 per cent, and for a system having 42 volts as the nominal system voltage then the drop is only 5 to 7 per cent. Thus not only is more system voltage available as useful output, but also power losses are reduced. Given a higher voltage then the current is correspondingly lower and thus heating losses in the power semi-conductor devices are correspondingly lower.

I claim:

1. A starter-generator comprising; a rotor assembly including a plurality of circumferentially disposed rare earth-iron permanent magnets,
    a stator assembly within which said rotor assembly in rotatable, said stator assembly including an annular stator body formed from a silicon containing iron alloy of high electrical resistivity and low magnetic loss, and a multiphase stator winding secured to an inner periphery of said stator body and lying in and airgap defined between the stator body and the rotor assembly,
    a semiconductor inverter-rectifier assembly electrically connected with said multiphase stator winding for rectifying and controlling the output from the stator winding when acting in generator mode, and for switching the input to the winding when operating in motor mode, and,
    means associated with said semiconductor inverter-rectifier assembly whereby the angular position of the rotor assembly is determined for controlling switching of the electrical input to the stator winding to afford operation in motor mode.

2. A starter-generator as claimed in claim 1 wherein said annular stator body is formed from an amorpous or microcrystalline, silicon containing iron alloy.

3. A starter-generator as claimed in claim 1 designed to operate in a vehicle electrical system whose nominal operating voltage is selected from the range 24 to 42 volts.

4. A starter-generator as claimed in claim 2 wherein said laminated stator body is a spiral wound wound alloy strip.

5. A starter-generator as claimed in claim 1 further comprising a stainless steel band encircling said permanent magnets of said rotor assembly.

6. A starter-generator as claimed in claim 1 further comprising a band of synthetic resin material encircling said permanent magnets of said rotor assembly.

7. A starter-generator as claimed in claim 1 wherein the rare earth component of the material of said permanent magnets is chosen from the group comprising neodymium, praesodymium, a mixture of neodymium and praesodymium, and, misch-metal.

* * * * *